Dec. 3, 1929.  W. T. JONES  1,738,248
VALVE
Filed Sept. 17, 1928
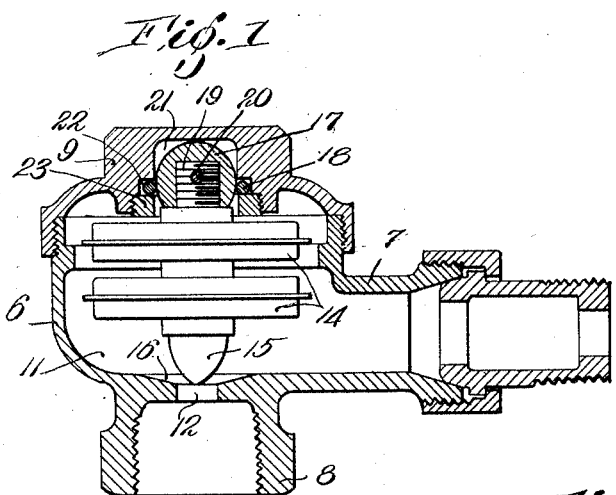
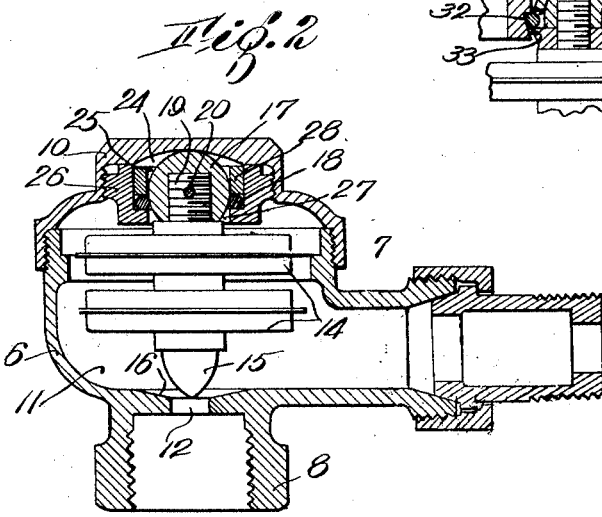
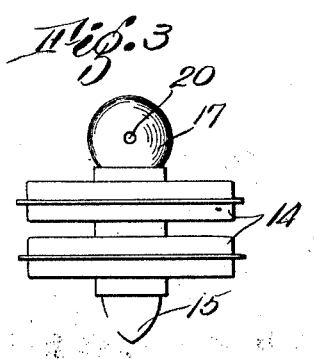
Inventor
William T. Jones
by Roberts, Cushman + Woodbury
Attys Patented Dec. 3, 1929

1,738,248

UNITED STATES PATENT OFFICE

WILLIAM T. JONES, OF NEWTONVILLE, MASSACHUSETTS, ASSIGNOR TO BARNES & JONES, A COPARTNERSHIP CONSISTING OF WALTER E. BARNES, OF WELLESLEY, MASSACHUSETTS, AND WILLIAM T. JONES, OF NEWTONVILLE, MASSACHUSETTS

VALVE

Application filed September 17, 1928. Serial No. 306,392.

This invention relates to automatic valves for controlling fluids under pressure and pertains more particularly to improvements in the construction of thermostatic valves adapted automatically to regulate the flow of fluids subject to temperature or pressure variations, for example outlet valves for steam radiators.

As more fully described in the copending application of Charles F. Fernald, Serial No. 306,336, filed September 17, 1928, it is highly desirable to provide for ready removal and replacement (for repairs, removal or the like) of the valve actuating element, usually metallic sealed bellows or the like which responds to temperature or pressure variation, but at the same time to insure accurate setting of the parts when the actuating element is returned to its place. As disclosed in the aforesaid application the actuating element is removably held in position but without substantial possibility of error in adjustment by means of a plug setting into a snap socket in the valve cover. This arrangement is in general highly desirable as fully meeting the above-mentioned requirements but since it holds the valve actuating device and the valve carried thereby rigidly, it fails to provide for slight inaccuracies in machining the valve casing or for the minute variations in shape or position of the parts due to temperature and pressure changes so that under some conditions the valve may not set as accurately as desired.

In accordance with the present invention I have provided an improvement upon the structure of the aforesaid application by so modifying the construction as, while still retaining all of the advantages of the device set forth in said application, to permit the valve accurately to center itself relatively to its seat in spite of any such inaccuracies in shape or position as may occur. To this end I provide a plug and socket so relatively shaped as to permit the actuating element with the valve to swing about their point of support but without affecting the accuracy of initial adjustment. For this purpose I preferably provide a plug of spherical contour, the socket, if desired, being substantially cylindrical and of such depth that when the plug is in proper position it bears against the inner wall of the socket, being held in this position by a snap ring seated in a recess in the socket wall or by other and equivalent retaining means.

Recommended embodiments of the invention, designed particularly for use in connection with the trap or outlet of a steam radiator, are shown for the purpose of illustration in the accompanying drawings, in which, Fig. 1 is a vertical section through an outlet valve embodying the aforesaid improvement;

Fig. 2 is a similar view illustrating a modified structure;

Fig. 3 is an elevation of the assembled actuating element shown in Figs. 1 and 2;

Fig. 4 is a detail plan view of a spring ring forming part of the snap attachment; and Fig. 5 is a fragmentary sectional view illustrating an optional construction.

The improved valve preferably comprises the usual casing 6 which may be of cast iron or other suitable material having the inlet connection 7 and the outlet connection 8; a removable fluid-tight cover 9 (Fig. 1) or 10 (Fig. 2) having screw threaded engagement with casing 6, thereby providing a chamber 11 communicating with the inlet 7, and, through a valve port 12, with the outlet 8; an automatic actuating or controlling element consisting, for example, of one or more expansible metal cells 14, and carrying the valve 15 properly shaped to cooperate with valve seat 16 to close the port 12; and means for attaching the actuating element to and suspending it from the casing cover in operative relationship.

As the principal features of this invention reside in the construction and arrangement of the said attaching means, the precise construction of the controlling element is not essential. Any customary type of automatic valve controlling device may be employed, and the valve-carrying thermostatic member comprising the circular expansible cells 14 adapted to contain an expansible or volatile fluid such as alcohol and having customary intercommunicating passages (not shown), is illustrated merely as a suitable actuating element for the purpose. The operation of such a device is well understood; the cells 14 expanding or contracting by reason of temperature variations affecting their fluid contents, whereby the valve 15 is moved toward or from the port 12.

In order detachably to connect the actuating element to the cover in such a manner that axial adjustment or movement of the parts after attachment is effectively prevented, a round-surfaced, preferably ball-shaped, knob 17 is rigidly connected to the actuating element and is adapted to fit within a recess or socket formed in the cover and to be retained therein by means of a cooperating resilient locking member, such as a resilient split ring 18. The knob 17 may be rigidly attached to the actuating element by threading it upon an upstanding spindle 19 forming part of said element and securing it by a through pin 20 or other suitable means.

The socket for receiving the knob 17 and the locking spring for securing the knob within the socket in the manner of a snap fastening, may take various forms. For example, in Fig. 1, the socket 21 is formed in the body of the cover 9 and has an annular groove or recess 22 adapted to house the spring ring 18; and a retainer ring 23 has screw threaded engagement with the mouth of said socket, removably to hold the ring 18 loosely in its socket. When snapped into place by expanding the ring 18, the ball 17 abuts against the end wall of the socket and is secured in such position by the engagement of the automatically contracted split ring so that axial movement of the actuating element is effectively prevented.

In the modification shown in Fig. 2 the top portion of the cover may have a dished recess 24 constituting the inner end of a socket 25 formed by the inner wall of the retainer ring 26 which is screw threaded within the cover 10. Said retainer ring has an annular shoulder 27 to support the split ring 18 and a spacer ring 28 is provided between the ring 18 and the dished end 24 of the socket to hold ring 18 in proper position with respect to the ball 17. Said ball is snapped into place and is engaged by the ring as in Fig. 1.

As indicated in the modification of Fig. 5, the compressible split ring 18 may be suitably carried within a circumferential groove 29 in the ball 30 and the side wall of the cover socket 31 may have a shallow groove 32 which tapers in diameter as at 33, to receive the expanded locking ring 18 after the ball has been snapped in place, and thus detachably secure the parts together.

In either of the aforesaid constructions the ball knob of the actuating element may be attached to the cover by snapping it into the cover socket with a single motion, and when so attached the position of the actuating element with respect to the cover and the valve port is fixed in adjusted position; nevertheless the ball may be rotated slightly in the socket so as to permit universal swinging movement of the actuating element and valve whereby proper seating of the valve 15 over port 12 is assured. There is no screw threaded or other adjustable connection between the actuating element and the valve casing. The controlling element may be readily detached from the cover by pulling the ball from its socket, thereby expanding the split ring in the construction of Figs. 1 and 2, or compressing it in the optional design of Fig. 5. The assembled actuating element may accordingly be interchanged for a new unit at any time without affecting the adjusted relation of the parts.

When used in connection with the outlet of a steam radiator, the inlet 7 of the valve casing is attached to the outlet of the radiator, and the outlet 8 is connected to the return pipe. Before steam is turned on, the actuating element and its rigidly connected valve 15 occupies the position shown in Figs. 1 and 2, the cells 14 being contracted and thereby holding the valve 15 off its seat 16. The steam is then free to enter the radiator driving out any air or water through the inlet connection 7, through the chamber 11, and thence outwardly through the port 12 and outlet 8. When the radiator has filled with steam so that hot steam enters the chamber 11, the expansible fluid within the cells 14 is warmed and expands, thus expanding the cells 14 and forcing the valve 15 against seat 16, closing the passage 12. The valve 15 remains closed until water of condensation or air has collected in the chamber 11 sufficiently to cool the cells 14, whereupon they again contract, opening the valve 15 and allowing the water of condensation and entrapped air to escape.

The proper adjustment of the valve is affected by regulation of the actuating element before assemblage, so that the relative dispositions of the valve parts after the actuating element is snapped into position in the cover socket is fixed and there is no occasion for adjustment during installation or use. If the valve should fail properly to function at any time during use, a new assembled and adjusted unit may be exchanged as aforesaid.

A valve constructed in the manner above described is economical to manufacture, easy to install or replace, durable and efficient in use, and substantially fool-proof. Such a valve is adapted to a variety of uses and it will be understood that details of structure may be varied for particular purposes without departing from the spirit of this invention as defined in the following claims

I claim:

1. A valve structure comprising a casing having a valve seat, a removable cover having fluid-tight engagement with the casing, said cover having a socket, a spring member associated with said socket, a valve cooperable with the valve seat, and an actuating element for the valve, said actuating element having a knob adapted to seat within the socket and to be held therein by the spring, thereby to hold the actuating element and its valve in adjusted position with respect to the valve seat, said knob and socket being so shaped as to permit the valve to move freely to center itself on its seat.

2. A valve structure comprising a casing having a valve seat, a removable cover having fluid-tight engagement with the casing and disposed opposite said seat, an actuating element having a valve fixed thereto and cooperable with the valve seat, said cover having a socket, a knob secured to the actuating element and adapted to seat in the socket, and a spring member engaging the socket and the knob, when the knob is received within the socket, thereby removably to retain the knob within the socket and to hold the actuating element and its valve in adjustable position with respect to the valve seat, the knob and socket being so shaped as to permit universal swinging movement of the actuator and valve.

3. A valve structure comprising a casing having a valve seat, a removable cover having fluid-tight engagement with the casing, an actuating element within the casing, a valve fixed to the actuating element and cooperable with said seat, a substantially spherical knob fixed to said element, said cover having a socket adapted to receive said knob, and a spring ring engaging the socket and knob, when the knob is received within the socket, and adapted resiliently to hold the knob against the end wall of the socket, thereby removably to retain the parts together in adjusted relationship and to allow slight rotation of the knob within the socket.

4. A valve structure comprising a casing having a valve seat, a removable cover having fluid-tight engagement with the casing and disposed opposite said seat, an actuating element within the casing and having its axis substantially in line with the axis of said seat, a valve fixed axially to said element and cooperable with said valve seat, a ball fixed to said element at the opposite end of its axis, a socket in the cover receiving the ball, the wall of said socket having an annular groove, and a spring ring loosely carried in said groove and resiliently engaging said ball, thereby removably to retain the ball within the socket and to hold the actuating element and its valve in adjusted position with respect to the valve seat.

5. A valve structure comprising a casing having a valve seat, a removable cover having fluid-tight engagement with the casing and disposed opposite said seat, an actuating element within the casing and having its axis substantially in line with the axis of said seat, a valve fixed axially to said element and cooperable with said valve seat, a ball fixed to said element at the opposite end of its axis, a socket in the cover receiving the ball, the wall of said socket having an annular groove, and a spring ring loosely carried in said groove and resiliently engaging said ball, thereby removably to retain the ball within the socket and to hold the actuating element and its valve in adjusted position with respect to the valve seat, and a retainer ring having screw threaded engagement with the mouth of said socket for removably holding said ring in said groove.

Signed by me at Boston, Massachusetts, this eleventh day of September, 1928.

WILLIAM T. JONES.